(12) United States Patent
Sattler et al.

(10) Patent No.: US 10,814,293 B2
(45) Date of Patent: Oct. 27, 2020

(54) FOAM GENERATOR

(71) Applicant: Washtec Holding GmbH, Augsburg (DE)

(72) Inventors: Andreas Sattler, Munich (DE); Stefan Mayer, Neusäß (DE)

(73) Assignee: WASHTEC HOLDING GMBH, Augsburg (DE)

( * ) Notice: Subject to any disclaimer, the term of this patent is extended or adjusted under 35 U.S.C. 154(b) by 320 days.

(21) Appl. No.: 15/758,420

(22) PCT Filed: Jul. 27, 2016

(86) PCT No.: PCT/DE2016/100344
§ 371 (c)(1),
(2) Date: Mar. 8, 2018

(87) PCT Pub. No.: WO2017/041781
PCT Pub. Date: Mar. 16, 2017

(65) Prior Publication Data
US 2018/0257049 A1    Sep. 13, 2018

(30) Foreign Application Priority Data
Sep. 9, 2015   (DE) .................. 10 2015 011 501

(51) Int. Cl.
*B01F 3/04*       (2006.01)
*B01F 5/06*       (2006.01)
*B60S 3/04*       (2006.01)
*C11D 17/00*      (2006.01)

(52) U.S. Cl.
CPC .............. *B01F 5/0696* (2013.01); *B01F 3/04* (2013.01); *B01F 3/04446* (2013.01); *B60S 3/04* (2013.01); *C11D 17/0008* (2013.01); *B01F 2215/0077* (2013.01)

(58) Field of Classification Search
CPC ........ B01F 3/04; B01F 5/0696; B01F 3/0446; B08B 9/027; B08B 9/08
See application file for complete search history.

(56) References Cited

U.S. PATENT DOCUMENTS 6,561,200 B1 *  5/2003  Fournel ............... B01F 3/04446
                                            134/21
2003/0217421 A1   11/2003  Besel

FOREIGN PATENT DOCUMENTS

| DE | 8034885 U1 | 4/1981 |
|----|------------|--------|
| EP | 0167947 A2 | 1/1986 |
| FR | 798968 A1  | 5/1936 |

(Continued)

OTHER PUBLICATIONS

International Search Report dated Nov. 23, 2016 for PCT/DE2016/100344 filed Jul. 27, 2016.

(Continued)

*Primary Examiner* — Robert A Hopkins
(74) *Attorney, Agent, or Firm* — Paul D. Bianco; Gary S. Winer; Fleit Intellectual Property Law

(57) ABSTRACT

A foam generator, in particular for a motor vehicle washing installation, includes a foam generation chamber having at least one inlet for water, surfactant and gas, in particular compressed gas, and one outlet for foam, and contains a fluid-permeable bed of loose particles. The bed fills the foam generation chamber sufficiently to prevent fluidization of the bed.

13 Claims, 1 Drawing Sheet

(56) References Cited

FOREIGN PATENT DOCUMENTS

GB        2247411 A     3/1992
JP        H0221933 A    1/1990

OTHER PUBLICATIONS

Written Opinion for PCT/DE2016/100344 filed Jul. 27, 2016.
International Preliminary Report on Patentability for for PCT/DE2016/100344 filed Jul. 27, 2016.
English translation of International Preliminary Report on Patentability for PCT/DE2016/100344 filed Jul. 27, 2016.
Auwa, Power Tecs, Super Clean and Risk-Free, translation from German to English, printed on Feb. 28, 2018.

* cited by examiner

FOAM GENERATOR

FIELD OF THE INVENTION

The present invention relates to a foam generator, in particular for use in a motor vehicle washing installation. A foam generator is a system for generating foam from a gas, in particular air, water and an auxiliary substance (surfactant), which are fed into the system.

BACKGROUND OF THE INVENTION

So-called fluidization or fluidized bed units, in which a bed of solid particles is transformed into a fluid-like state by pumping a fluid through it, and in which the particles suspended by the fluid flow are able to move randomly relative to one another like the molecules of a fluid or a gas, is used in many fields of technology.

DE 80 34 885 U1 describes a prior-art foam generator in which a surfactant solution flows through a chamber, thereby causing the plastic beads in the chamber to move as they would in a fluidized bed. The movement of the beads leads to the formation of foam in the solution, which foam, together with the solution, is discharged under pressure from the chamber. The disadvantage of this foam generator is said to be, inter alia, that the beads during operation are subjected to wear and tear, and to remedy the situation, a foam generator is proposed in which the beads are replaced with strainers that are stationarily mounted in the chamber and through which the surfactant solution is pressed and thereby foamed.

However, a first disadvantage of the solution proposed is that a large number of strainers are needed to generate fine-bubbled foam and that the degree of technical complexity in the assembly of the foam generator increases as the number of strainers increases.

A second disadvantage is the reduced tolerance to dirt particles in the surfactant solution. As a rule, motor vehicle washing installations operate in a closed water circulation cycle in which the water is treated and re-used after a wash cycle.

Residues of suspended materials remaining in the treated water do not impair the cleaning result. However, if these suspended materials become trapped in the strainers of the foam generator proposed in DE 80 34 885 U1, clogging will occur. As a result, the foam generator will have to be disassembled and cleaned, which leads to increased maintenance costs for the operator of the motor vehicle washing installation and potentially to a service interruption that may inconvenience the customers.

SUMMARY OF THE INVENTION

A foam generator and a method of operating a foam generator that produce foam having high homogeneity using a simple design and requiring low maintenance are disclosed.

Other embodiments are also disclosed.

As long as the particles in a bed are at rest and in contact with one another, their space requirement is low. When a fluid is pumped from the bottom through a bed, thereby lifting the particles, the bed expands. The increase in volume at which fluidization sets in depends on a number of different parameters, in particular on the shape of the particles and the degree of their orientation. In a random bed, this increase in most cases amounts to approximately 5%. A lattice-like, ordered arrangement of particles can have a considerably higher density than a random bed; thus, the increase in volume until fluidization is correspondingly higher.

Given the fact that according to the invention the bed fills the foam generation chamber sufficiently to no longer allow the expansion required for fluidization, fluidization is suppressed. Thus, wide-ranging movements of the particles in the bed, which cause numerous collisions and consequently lead to wear of the particles, are prevented.

When the stream of surfactant solution that is generated, at the latest in the foam generation chamber of the foam generator according to the invention, using the water and surfactant supplied is sufficiently strong to be able to fluidize a bed, the increase in volume of which is not limited, the bed in the foam generation chamber is instead moved in the direction of the outlet where it is compressed by the stream so that movement of the bed particles relative to one another is suppressed.

The foam is not generated by the movement of the particles; instead, use is made of the fact that the stream of gas flowing through the bed has to be distributed to a plurality of pores between the particles of the bed that are in contact with one another.

Because foam is generated only in the regions in which the gas and fluid in the bed collide with each other, it would be useful, for the purpose of efficient foam generation, to completely fill out the foam generation chamber with the bed. The particles of the bed would then be completely immobilized, and wear would be reduced to a minimum as well. However, an advanced embodiment of the invention proposes that a portion of the foam generation chamber remain free of the bed, the size of which portion corresponds to at least half of the increase in volume required for fluidization. The reason for this measure is that movement of the bed particles, which is made possible by turning the flow on and off, ensures that the dirt entering with the water and captured by the particles of the bed is shaken loose, over time migrates through the bed and is discharged along with the foam from the foam generation chamber. As a result, clogging of the bed by residual substances that are entrained in the treated water is prevented.

The narrower the pores of the bed, the finer will be the bubbles of the foam generated in the foam generator, and therefore the preferred size of the particles in the bed measures a maximum of 5 mm.

On the other hand, excessively narrow pores also lead to a large drop in pressure in the bed, which impairs the throughput of air and surfactant solution through the bed and, as a result, the productivity of the foam generator. Therefore, the particle size should not fall below 1 mm.

When large particles in the bed collide with one another, the pores bounded by these particles have a large cross-section and allow high flow rates. As a result, in a bed having particles of varying sizes, the large pores will attract a disproportionately high fraction of the mass flow, whereas only a weak, barely turbulent mass flow is generated in the small pores. Therefore, the more uniform the size of the particles, the better will be the homogeneity of the foam and the smaller will be the volume of the bed required to obtain a given foam quality. Thus, at least 90 wt % of the bed should consist of particles whose sizes differ at most by a factor of 2, and more preferably at most by a factor of 1.5. More homogeneous beds are technically feasible without any problems, but in most cases they are unattractive because of their comparatively high price.

The quality of the foam also depends on the height of the bed, through which the air must pass. To obtain a fine-bubbled foam having high homogeneity, the height of the bed should measure at least 20 times the mean particle size. However, if the height of the bed exceeds one hundred times the mean particle size, this may, at best, lead to an increase in the pressure drop, but it will not further improve the quality of the foam.

The material used for the bed can be any material that is resistant to the surfactant solution used. An especially low-cost option is fine gravel or crushed rock; however, the disadvantage is that the relatively rough surfaces of these materials have a strong tendency to retain the residual substances entrained in the treated water and to release them only reluctantly during the jolts associated with turning the fluid flow on and off. Preferred are beds consisting of materials, such as plastic, glass or metal, that have smoother surfaces and can be produced with little expense and effort. Because of their microbial growth-inhibiting properties, copper or copper alloys, such as bronze, may be interesting options, especially if the water in a motor vehicle washing installation that comprises the foam generator according to the present invention is circulating in a closed circuit.

If the particle size is sufficiently uniform, a low-cost bed can consist of parts of extruded sections. If the extruded section is a hollow section, it is also possible for the bed to have a high porosity.

According to a preferred alternative embodiment, the bed particles are beads. The pores of a bead bed have each a plurality of extensions branching out from a central region and tapering at an acute angle toward a point of contact between two beads, in which extensions the flow rate is markedly lower than in the central region and that merge into each other by continually changing direction. As a result, even a low mass flow of air and surfactant solution suffices to produce a highly turbulent flow in the pores, thereby efficiently generating foam.

The problem is also solved using a method of operating a foam generator, in particular a foam generator of the type described above, in which foam is generated by pumping a stream of water, surfactant and gas through a bed in a foam generation chamber and the flow rate is regulated so that the bed is moved from a rest position on the inlet side of the foam generation chamber to an operating position on the outlet side of the foam generation chamber where it is held immobile.

BRIEF DESCRIPTION OF THE DRAWINGS

Additional features and advantages of the invention follow from the description of the practical examples below, with reference to the appended figures. The figures show.

DETAILED DESCRIPTION OF THE INVENTION

Figure 1:
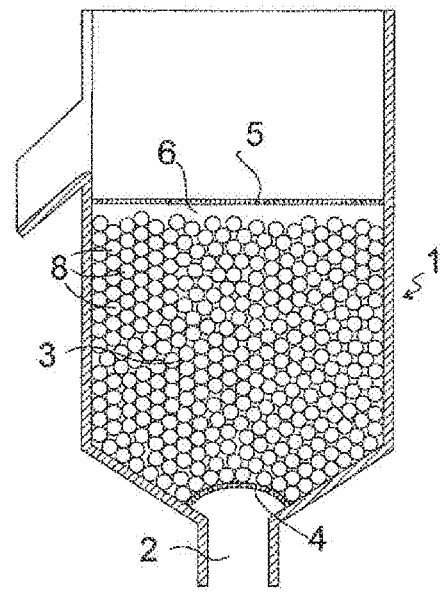
FIG. 1 a diagrammatic section through the foam generator according to the invention in the rest position.

FIG. 1 shows a section through the foam generator according to the present invention along a vertical sectional plane. It shows a foam generation chamber 1 having a shared inlet 2 for water, surfactant and compressed air on its lower end. As an alternative, two or three inlets can be provided to supply air and fluid or the three components together and to merge these components only after they are in the foam generation chamber 1.

A bed 3 of spherical glass beads 8 fills up the major portion of the foam generation chamber 1. A strainer 4 on the bottom of the foam generation chamber 1 prevents the bed 3 from entering the inlet 2. A second strainer 5 closes the foam generation chamber 1 at the top. A free space 6 between the surface of the bed 3 and the strainer 5 occupies a small percentage of the volume of the foam generation chamber 1.

The strainer 5 can be removed to allow glass beads 8 to be poured from the top into the foam generation chamber 1. The resulting arrangement of glass beads 8 is looser than its maximum density ordered for packing and can be marginally further compacted by joggling; in practice, the chamber 1 can be filled up to the level at which the strainer 5 is mounted, and a suitably sized free space 6 is subsequently formed as the beads 8 undergo settling movements.

Once the beads 8 have been poured in and the strainer 5 has been remounted, operation of the foam generator can be started by feeding in water, surfactant and compressed air via the inlet 2. By means of metering valves located upstream of the inlet 2, the ratio among air, water and surfactant can be adjusted, and the consistency of the finished foam can thus be controlled.

Figure 2:
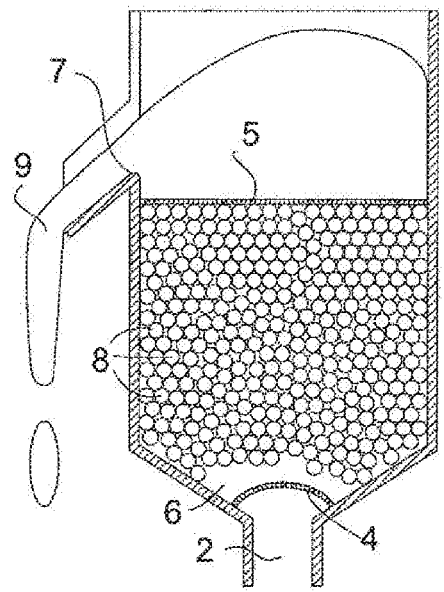
FIG. 2 a section through the foam generator as shown in FIG. 1 in the operating position.

The total mass flow of the three components is sufficiently high to lift the beads 8 from the bottom of the foam generation chamber 1. However, because the bed 3 comes in contact with the bottom of the strainer 5 on the outlet side before it can fluidize, only a single jolt-like movement occurs, which causes the entire bed 3 to be lifted from the bottom and to subsequently sit close to the lower surface of the strainer 5 as shown in FIG. 2. Because the surface of the bed 3 has to conform to [the shape of] the strainer 5, the beads 8 are temporarily displaced relative to one another; as soon as the bed has made intimate contact with the strainer 5, the movement of the beads 8 relative to one another stops. Residual substances, which prior thereto had accumulated on the beads 8, are shaken loose by this movement or separated by means of the rubbing contact of the beads 8 against one another and are subsequently entrained in the stream of water, air and surfactant until they are either redeposited on a bead 8 located further downstream or until they, along with the foam 9 generated, pass through the strainer 5 and are discharged from the foam generator via an overflow edge 7.

After turning off the supply of air, water and surfactant, the bed 3 returns to the rest position shown in FIG. 1.

Figure 3:
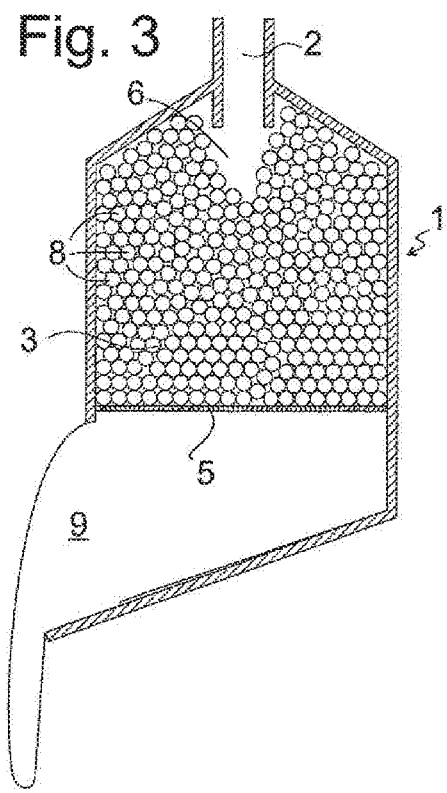
FIG. 3 a section through a second foam generator according to the invention.

FIG. 3 shows a variation of the foam generator in which an inlet 2 for air, water and surfactant is disposed on the upper end of the foam generation chamber 1 so that the flow passes through the bed 3 from the top to the bottom to the strainer 5 on the outlet side, which here forms the bottom of the foam generation chamber 1, and foam 9 is discharged downward through the strainer 5. A free space 6 above the bed 3 has the same size as that shown in FIGS. 1 and 2.

In the foam generator shown in FIG. 3, the bed 3 is sitting on the strainer 5, both while in operation and while the flow is turned off. However, because the stream of water in this case is not distributed by means of a strainer on the inlet side, but instead strikes the bed 3 in the form of a jet, the beads 8 of the bed are whirled upward whenever the flow is turned on so that deposits are whirled upward and flushed away. However, as soon as the flow has stabilized, the small volume of the empty space 6 ensures that the beads 8 that bound the empty space are tightly pressed against the beads 8 disposed farther back and are held immobile.

REFERENCE CHARACTERS

1 Foam generation chamber
2 Input

3 Bed
4 Strainer
5 Strainer
6 Empty space
7 Overflow edge [outlet]
8 Glass bead
9 Foam

The invention claimed is:

1. A method for producing foam for a motor vehicle washing installation, wherein a foam generating chamber has at least one inlet for water, surfactant and gas, in particular compressed air, an outlet for foam, and a fluid-permeable bed of loose particles, and by pumping a stream of water, surfactant and gas through the bed in the foam generating chamber, thereby lifting the particles, foam is generated, wherein the bed fills the foam generation chamber sufficiently to prevent fluidization of the bed and a portion of the foam generation chamber remains free of the bed, the size of which portion corresponds at least to half the increase in volume required for fluidization of the bed.

2. The method according to claim 1, wherein the size of the particles of the bed measures between 1 and 5 mm.

3. The method according to claim 1, wherein at least 90 wt % of the bed comprises particles, whose sizes differ at most by a factor 2.

4. The method according to claim 1, wherein the height of the bed measures at least 20 times the mean size of the particles.

5. The method according to claim 1, wherein the particles include plastic, metal, or glass.

6. The method according to claim 1, wherein the particles are parts of an extruded section.

7. The method according to claim 1, wherein the particles are beads.

8. The method according to claim 3, wherein at least 90 wt % of the bed comprises particles, whose sizes differ at most by a factor of 1.5.

9. The method according to claim 5, wherein the particles are made of copper or a cooper alloy.

10. The method according to claim 6, wherein the particles are parts of a hollow section.

11. The method according to claim 1, wherein pumping the stream of water, surfactant and gas through the bed moves the bed from a rest position on the inlet side of the foam generation chamber to an operating position on the outlet side of the foam generation chamber where the bed is held immobile.

12. A motor vehicle washing installation comprising a foam generator with a foam generating chamber having at least one inlet for water, surfactant and gas, in particular compressed air, on a lower end and an outlet for foam and a fluid permeable bed of loose particles, wherein the bed fills the foam generation chamber sufficiently to prevent fluidization of the bed and a portion of the foam generation chamber remains free of the bed, the size of which portion corresponds at least to half the increase in volume required for fluidization of the bed.

13. A method for producing foam for a motor vehicle washing installation, wherein a foam generating chamber has at least one inlet for water, surfactant and gas, in particular compressed air, an outlet for foam, and a fluid-permeable bed of loose particles, and by pumping a stream of water, surfactant and gas through the bed in the foam generating chamber foam is generated, wherein the bed fills the foam generation chamber sufficiently to prevent fluidization of the bed and a portion of the foam generation chamber remains free of the bed, the size of which portion corresponds at least to half the increase in volume required for fluidization of the bed and wherein the particles are part of an extruded hollow section.

* * * * *